Dec. 13, 1960     T. W. DAYKIN ET AL     2,964,363
BEARING
Filed May 19, 1958
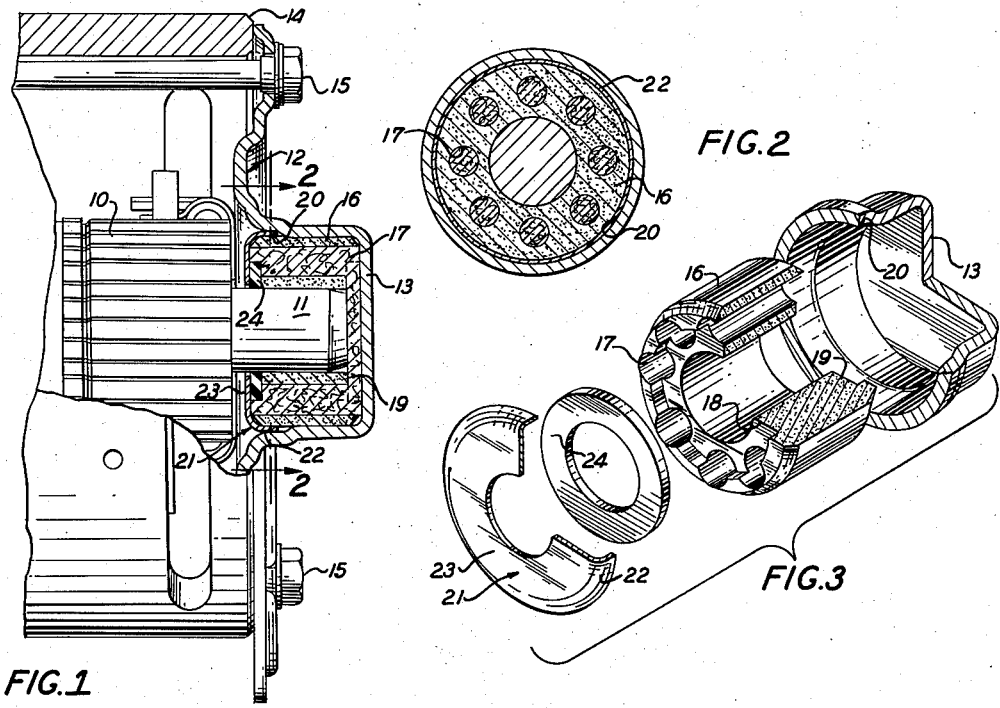
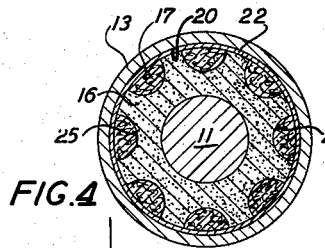
FIG.4
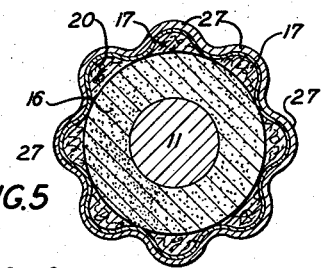
FIG.5
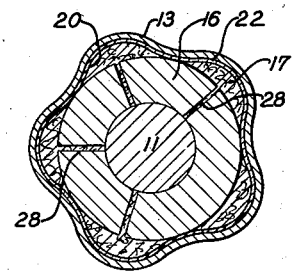
FIG.9
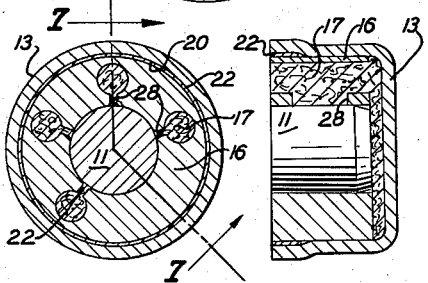
FIG.6
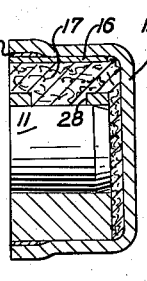
FIG.7
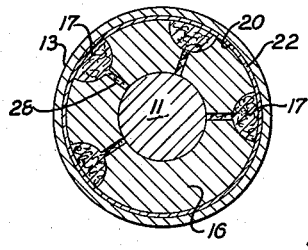
FIG.8
T. W. DAYKIN
F. R. REITZ
A. J. THIBODEAU
INVENTOR.
BY E. C. McRae
J. R. Faulkner
J. H. Oster
K. L. Zerschling
ATTORNEYS United States Patent Office 2,964,363
Patented Dec. 13, 1960

2,964,363

BEARING

Theodore W. Daykin, Dearborn, Frederick R. Reitz, Wayne, and Arnold J. Thibodeau, Allen Park, Mich., assignors to Ford Motor Company, Dearborn, Mich., a corporation of Delaware Filed May 19, 1958, Ser. No. 736,144

3 Claims. (Cl. 308—121)

This invention relates to sleeve type bearings and more particularly to permanently lubricated sleeve type bearings suitable for use in generators, electric motors and other rotating equipment.

The sleeeve type bearing assembly of the present invention comprises, in general, a reservoir filled with a suitable lubricant, means for metering the flow of lubricant to the bearing surface and means for returning the lubricant to the reservoir after use. Since the lubricant is returned to the reservoir after use, the bearing need only be lubricated during its manufacture or assembly with further lubrication being unnecessary.

An object of the present invention is the provision of a permanently lubricated sleeve type bearing suitable for use in generators, electric motors and other rotating equipment.

Another object of the present invention is the provision of a permanently lubricated sleeve type bearing suitable for use in generators, electric motors and other rotating equipment in which the lubricant may continuously circulate through the bearing.

A further object of the invention is the provision of a permanently lubricated sleeve type bearing suitable for use in generators, electric motors and other rotating machinery which is inexpensive and has an extremely long life under heavy duty operation.

Still another object of the present invention is the provision of a permanently lubricated sleeve type bearing assembly for a generator, electric motor or other rotating equipment which need not be disassembled when other parts of the equipment need servicing.

Other objects and attendant advantages of the invention will become more apparent when the specification is considered in connection with the accompanying drawings in which:

Figure 1 is a partial longitudinal sectional view of a portion of a dynamoelectric machine employing one embodiment of the sleeve type bearing of the present invention;

Figure 2 is a cross sectional view taken along the lines 2—2 of Figure 1;

Figure 3 is an exploded view of the bearing assembly of Figure 1;

Figure 4 is a cross sectional view of a second embodiment of the invention taken along the same lines as Figure 2;

Figure 5 is a cross sectional view of a third embodiment of the invention taken along the same lines as Figure 2;

Figure 6 is a cross sectional view of a fourth embodiment of the invention taken along the same lines as Figure 2;

Figure 7 is a longitudinal sectional view of the fourth embodiment of the invention taken along the lines 7—7 of Figure 6;

Figure 8 is a cross sectional view of a fifth embodiment of the invention taken along the same lines as Figure 2; and, Figure 9 is a cross sectional view of a sixth embodiment of the invention taken along the same lines as Figure 2.

Referring now to the drawings in which like reference numerals designate like parts throughout the several views thereof, there is shown in Figure 1 a partial longitudinal sectional view of a dynamoelectric machine employing one embodiment of the present invention in which an armature including a commutator 10 is mounted upon a shaft or journal 11. An end plate 12 having a cup shaped housing 13 is fastened to the frame 14 of the machine by means of tie bolts 15. A porous metal sleeve 16, preferably constructed of sintered bronze having a plurality of reservoirs 17 and annular recessed portions 18 and 19 positioned therein is press fitted in the cup shaped housing 13 to receive shaft or journal 11 in such a way that considerable axial clearance exists between the recessed portion 19 of the sleeve and the end of the housing. The reservoirs 17 are shown as extending substantially axially through the sleeve, but it is obvious that reservoirs of various configurations may be employed to suit any given application.

The cup shaped housing 13 has a portion of enlarged internal diameter 20 for receiving a retainer 21 having an axially extending flange 22 fitting between the sleeve 16 and the portion 20 of the housing, and having an annular inwardly extending flange 23 spaced axially from the annular recessed portion 18 of the sleeve. Press fitted upon the shaft or journal 11 and positioned in the space between the annular recessed portion 18 and the flange 23 of retainer 22 is a thin disk 24.

The porous metal sleeve 16 is impregnated with a suitable lubricant by any conventional method while the reservoirs 17 and the annular recessed portion 19 between the end of the sleeve 16 and the end of the cup housing 13 are filled with a cellular material—preferably of a cellulose material although other suitable cellular materials well known in the art will suffice—impregnated with the same lubricant used to impregnate the sleeve 16.

During the operation of the device in which the sleeve bearing of the present invention is employed, the shaft or journal 11 together with the disk 24 mounted thereon will rotate at high rates of speed. This causes lubricant from the sleeve 16, from the reservoirs 17, and from the cellular material positioned in the annular recessed portion 19 between the end of the sleeve 16 and the end of the cup housing 13 to form a film of lubricant between the bearing surface on the inner diameter of the sleeve 16 and the bearing surface on the outer diameter of the journal 11. The lubricant from the sleeve and the reservoirs as well as the lubricant from the cellular material positioned between the end of the sleeve and the end of the cup housing flows axially along the journal 11 forming the above mentioned film. Eventually this lubricant reaches the disk 24, where it is thrown off by centrifugal force into the reservoirs 17. The retainer 21 aids in directing the lubricant from the disk 24 back to the reservoirs where it is absorbed by the cellular material. An inspection of Figure 1 will reveal that the cellular material in the reservoirs 17 and the cellular material in the annular recessed portion 19 are in communication so that a portion of the lubricant thrown from the disk 24 into the reservoirs 17 will eventually find its way into the cellular material positioned in the annular recessed portion 19. Thus a circulating lubricating system for the bearing surface between the sleeve 16 and the journal 11 is provided and no lubricant need be added after assembly.

In assembling the sleeve bearing of the present invention, the reservoirs 17 in the lubricant impregnated sleeve 16 and end of the cup housing are suitably filled with the lubricant impregnated cellular material. The sleeve 16 is then pressed into the cup housing 13 in the end plate 12 thus filling the annular recesed portion 19 with cellular material. The disk 24 is placed in the annular recessed portion 18 and the retainer is pushed into position to secure the sleeve, the cellular material and the disk 24 in position. The end plate 12 is then placed in engagement with the frame 14. During this operation the journal or shaft 11 is fitted into the sleeve 16 and the disk 24 automatically positions itself on the shaft. As can be seen by reference to Figure 1, the shaft or journal 11 is beveled at one end to receive the disk 24 which has an internal diameter slightly smaller than the external diameter of the main portion of the journal 11 so that the disk will slide along the shaft in a press fit relationship until the end plate 12 comes into contact with the frame 14.

A second embodiment of the present invention is shown in Figure 4. This embodiment of the invention is similar in all respects to the embodiment illustrated in Figures 1 through 3 with the exception of the location of the reservoirs 17. As shown, the sleeve 16 has a plurality of dished portions 25 positioned in its outer periphery the surfaces of which form a wall for the reservoirs 17. The dished portions 25 preferably extend for the entire length of the sleeve. The outer wall of the reservoirs 17 is defined by the inner periphery of the cup shaped housing 13, and by the flange 23 of retainer 21 at the inboard end thereof.

A third embodiment of the invention shown in Figure 5 is similar to the embodiments illustrated in Figures 1 through 3 and Figure 4, again with the exception of the formation of the reservoirs 17. In this embodiment the cup shaped housing 13 is drawn with a plurality of radially extending protuberances 27 so that the reservoirs are defined by the outer surface of the sleeve 16 and the inner surfaces of the protuberances 27. The axially extending flange 22 of the retainer 21 may be similarly formed to fit within the protuberances 27 and direct the oil thrown outwardly by the centrifugal force generated by the disk 24 into the reservoirs 17. At the inboard end of the assembly the outer walls of the reservoirs are defined by the flange 23 of retainer 21.

In the three embodiments shown in Figures 6 through 9 a wrought bearing material, for example, copper or bronze, may be used. Figures 6 and 7 illustrate an embodiment of the invention using wrought bearing materials which is similar in design to the embodiment of the invention illustrated in Figures 1 through 3 in that the reservoirs are positioned wholly within the sleeve material. An oil groove 28 must be provided between each reservoir 17 and the bearing surface defined by the sleeve 16 and the outer diameter of the shaft or journal 11. Of course, the number of reservoirs must be limited to limit the oil grooves in the inner periphery of the sleeve to a reasonable number. Also, assuming the direction of rotation of the shaft or journal to be counterclockwise, as shown on Figure 6, the sleeve should not be relieved along the portion of maximum pressure which occurs approximately along the section line in the lower right portion of the cross section as shown in Figure 6.

Figure 8 illustrates an embodiment of the invention using wrought bearing materials which is similar in design to the embodiment shown in Figure 4. Of course, oil grooves 28 must be provided to conduct the oil from the reservoirs to the bearing surface.

Figure 9 illustrates an embodiment of the invention similar to the embodiment shown in Figure 5 but using wrought materials. As is the case with the embodiments shown in Figures 6 and 7 and Figure 8, oil grooves must be provided between the reservoirs 17 positioned between the protuberances 27 in the cup shaped housing 13 and the outer periphery of the sleeve 16 and the bearing surface between the shaft or journal 11 and the sleeve 16.

It can be readily appreciated by reference to Figure 1 that the shaft or journal 11 may be removed from the sleeve 16 and the disk 24 without disassembling the sleeve bearing assembly. The shaft can readily be pulled from the bearing assembly, if other parts of the machine mounted on said shaft need servicing, and can readily be re-inserted in the bearing assembly when the servicing has been completed.

Thus the present invention provides a permanently lubricated sleeve type bearing for rotating machinery which has a long life, is easily assembled and which need not be disassembled when other parts of the rotating machinery with which it is utilized are serviced.

It will be understood that the invention is not to be limited to the exact construction shown and described, but that various changes and modifications may be made without departing from the spirit and scope of the invention, as defined in the appended claims.

What is claimed is:

1. A bearing assembly comprising a housing, a sleeve positioned within said housing, a journal mounted for rotation within said sleeve, a surface of said sleeve defining a wall of said reservoir, said reservoir being filled with a cellular material containing a lubricant, said sleeve and said journal being spaced from the end of said housing, cellular material impregnated with a lubricant also being positioned between one of the ends of said journal and said sleeve and the end of said housing, the cellular material in said reservoir being in communication with the cellular material positioned between the ends of said sleeve and said shaft and the end of said housing, said sleeve having means for metering the flow of lubricant from the reservoir to the bearing surfaces of said journal and said sleeve so that the lubricant from the reservoir and the lubricant from the cellular material positioned at the end of the housing will form an oil film between the journal and the sleeve and will flow axially along the sleeve and journal to the other end of said sleeve and journal, a disk fixedly mounted upon said journal at said other end of the sleeve, said disk being in communication with said reservoir, the lubricant being returned to said reservoir by centrifugal force as it flows from the other end of said sleeve onto said disk, and a retainer press fitted between said sleeve and said housing and fitting in spaced relationship over the disk for retaining said sleeve in said housing and for directing the lubricant which is thrown off said disk by centrifugal force back to said reservoir.

2. A permanently lubricated sleeve type bearing assembly comprising, a housing, a porous metal sleeve impregnated with a lubricant positioned within said housing, a reservoir filled with a cellular material containing a lubricant, a surface of said sleeve defining a wall of said reservoir, said sleeve having an annular recessed portion at one end thereof, a retainer press fitted between said sleeve and said housing and engaging both said housing and said sleeve in a press fit relationship for holding said sleeve within said housing and having an annular inwardly extending flange positioned over said annular recessed portion, a journal mounted for rotation within said sleeve and extending through said annular inwardly extending flange, said journal having a disk fixedly mounted thereon positioned in said annular recessed portion in said sleeve, the lubricant in said sleeve and said reservoir forming a film between said sleeve and said journal and flowing along said sleeve and said journal upon rotation of said journal to the end of said sleeve and onto said disk, said lubricant being returned to said reservoir by centrifugal force, said retainer fitting over said reservoir whereby the oil thrown off said disk by centrifugal force is directed into said reservoir by said retainer.

3. A sleeve type bearing comprising a housing, a sleeve constructed of a nonporous material positioned within said housing, a journal mounted for rotation within said sleeve, a reservoir filled with a cellular material impregnated with a lubricant, a surface of said sleeve defining a wall of said reservoir, said sleeve and journal being spaced from the end of said housing, cellular material impregnated with a lubricant also being positioned between one of the ends of said journal and said sleeve and the end of said housing, the cellular material in said reservoir being in communication with the cellular material positioned between the ends of said sleeve and said journal and the end of said housing, said sleeve having a lubricating groove positioned therein between said reservoir and the bearing surface of said sleeve and said journal, the lubricant from said groove positioned in said sleeve and the lubricant from the cellular material positioned at the end of said housing forming a lubricating film between the sleeve and the journal and flowing axially along said journal to one end of said sleeve upon rotation of said journal, a disk fixedly mounted upon said journal at one end of said sleeve and being in communication with said reservoir and returning the lubricant to the reservoir by the centrifugal force generated when said journal is rotated.

References Cited in the file of this patent

UNITED STATES PATENTS

| | | |
|---|---|---|
| 2,516,021 | Samzelius | July 18, 1950 |
| 2,571,672 | Bradley | Oct. 16, 1951 |
| 2,761,746 | Abel | Sept. 4, 1956 |
| 2,761,747 | Abel | Sept. 4, 1956 |